United States Patent
Galle et al.

(10) Patent No.: US 12,305,580 B2
(45) Date of Patent: May 20, 2025

(54) GAS TURBINE ENGINE WITH ACTIVE VARIABLE TURBINE COOLING

(71) Applicant: RTX Corporation, Farmington, CT (US)

(72) Inventors: Nathan K. Galle, Portland, ME (US); Steven M. Dvorak, Dover, NH (US)

(73) Assignee: RTX CORPORATION, Farmington, CT (US)

( * ) Notice: Subject to any disclaimer, the term of this patent is extended or adjusted under 35 U.S.C. 154(b) by 53 days.

(21) Appl. No.: 17/991,078

(22) Filed: Nov. 21, 2022

(65) Prior Publication Data
US 2023/0092512 A1 Mar. 23, 2023

Related U.S. Application Data

(62) Division of application No. 16/034,573, filed on Jul. 13, 2018, now Pat. No. 11,530,650.

(51) Int. Cl.
| | |
|---|---|
| F02C 9/18 | (2006.01) |
| F02C 6/20 | (2006.01) |
| F02C 7/18 | (2006.01) |

(52) U.S. Cl.
CPC .............. *F02C 9/18* (2013.01); *F02C 6/20* (2013.01); *F02C 7/18* (2013.01); *F05D 2220/323* (2013.01); *F05D 2240/12* (2013.01); *F05D 2260/20* (2013.01)

(58) Field of Classification Search
CPC ...... F02C 6/08; F02C 6/20; F02C 7/14; F02C 7/18; F02C 9/18; F02C 9/52; F05D 2240/12; F05D 2260/20
See application file for complete search history.

(56) References Cited

U.S. PATENT DOCUMENTS

| | | | |
|---|---|---|---|
| 4,157,010 | A | 6/1979 | Sailer |
| 5,048,288 | A | 9/1991 | Bessette et al. |
| 5,134,844 | A | 8/1992 | Lee et al. |
| 5,394,687 | A | 3/1995 | Chen et al. |
| 5,581,996 | A | 12/1996 | Koch et al. |
| 6,612,114 | B1 * | 9/2003 | Klingels ............ F02C 7/18 |
| | | | 60/785 |

(Continued)

FOREIGN PATENT DOCUMENTS

| | | |
|---|---|---|
| EP | 2604807 A2 | 6/2013 |
| EP | 2952698 A1 | 12/2015 |

OTHER PUBLICATIONS

EP Application No. 19186143.4 Extended EP Search Report dated Dec. 13, 2019, 6 pages.

(Continued)

*Primary Examiner* — Jason H Duger
(74) *Attorney, Agent, or Firm* — CANTOR COLBURN LLP (57) ABSTRACT

A gas turbine engine includes a compressor section, a combustor section, and a turbine section operably coupled to the compressor section. A primary flow path is defined through the compressor section, the combustor section, and the turbine section. An engine case surrounds the compressor section, the combustor section, and the turbine section. The gas turbine engine also includes a means for providing an active variable cooling flow through a bypass duct external to the engine case to a secondary flow cavity of the turbine section.

17 Claims, 5 Drawing Sheets

(56) References Cited

U.S. PATENT DOCUMENTS

| | | |
|---|---|---|
| 8,281,601 B2 | 10/2012 | McMahan et al. |
| 2007/0137214 A1 | 6/2007 | Zewde et al. |
| 2008/0112797 A1* | 5/2008 | Seitzer .................... F01D 11/24 |
| | | 415/175 |
| 2010/0175387 A1 | 7/2010 | Foust et al. |
| 2014/0125121 A1* | 5/2014 | Edwards ............... H02J 7/1446 |
| | | 307/9.1 |
| 2014/0311157 A1 | 10/2014 | Laurello et al. |
| 2015/0275758 A1 | 10/2015 | Foutch et al. |
| 2016/0040605 A1 | 2/2016 | Howarth |
| 2016/0153361 A1* | 6/2016 | Morin ................. F04D 27/0215 |
| | | 415/144 |
| 2017/0059161 A1 | 3/2017 | Cheung et al. |
| 2018/0010520 A1 | 1/2018 | Iwasaki et al. |
| 2019/0032574 A1* | 1/2019 | Maguire ................ F02K 3/075 |
| 2019/0055889 A1 | 2/2019 | Heims et al. |
| 2020/0018240 A1 | 1/2020 | Galle et al. |

OTHER PUBLICATIONS

EP Application No. 19186143.4 Office Action dated Nov. 26, 2020, 3 pages.
European Office Action for Europe Application No. 19186143.4; Application Filing Date: Jul. 12, 2019; Date of Action: Oct. 13, 2021; 6 pages.

\* cited by examiner

GAS TURBINE ENGINE WITH ACTIVE VARIABLE TURBINE COOLING

CROSS-REFERENCE TO RELATED APPLICATIONS

This application is a division of U.S. application Ser. No. 16/034,573 filed Jul. 13, 2018, the disclosure of which is incorporated herein by reference in its entirety.

BACKGROUND

Exemplary embodiments pertain to aircraft systems, and more particularly to systems and methods of actively cooling a turbine section of a gas turbine engine.

Gas turbine engines can provide propulsion and power on an aircraft. Gas turbine engines can be implemented as Brayton cycle machines with balanced thermodynamic cycles, where work is a function of pressure and volume, and heat transfer is balanced. The net work for a thermodynamic exchange in a gas turbine engine may be expressed as work done on a substance due to expansion minus work done on recompression. Work can be lost at thermodynamic exchanges where a cooling air branch occurs without imparting a motive force to turbomachinery within a gas turbine engine. In some instances, pressures and temperatures within a gas turbine engine are constrained due to material properties, which can result in designs that are less efficient through losses than may otherwise be needed. There are parts in high temperature regions in a gas turbine engine that require active cooling, which is detrimental to performance and fuel efficiency. Typically, these high-temperature cooled parts are designed under worst case, highest temperature conditions.

BRIEF DESCRIPTION

Disclosed is a gas turbine engine that includes a compressor section, a combustor section, and a turbine section operably coupled to the compressor section. A primary flow path is defined through the compressor section, the combustor section, and the turbine section. An engine case surrounds the compressor section, the combustor section, and the turbine section. The gas turbine engine also includes a means for providing an active variable cooling flow through a bypass duct external to the engine case to a secondary flow cavity of the turbine section.

In addition to one or more of the features described above or below, or as an alternative, further embodiments may include where the means for providing the active variable cooling flow includes a cooling air metering valve.

In addition to one or more of the features described above or below, or as an alternative, further embodiments may include where the cooling air metering valve is electronically actuated based on either or both of a flight phase and an operating parameter of the gas turbine engine.

In addition to one or more of the features described above or below, or as an alternative, further embodiments may include where the means for providing the active variable cooling flow includes an airflow path within a static structure of the gas turbine engine between the bypass duct and the secondary flow cavity of the turbine section.

In addition to one or more of the features described above or below, or as an alternative, further embodiments may include where the airflow path includes an inner diffuser flow path configured to deliver a metered supply of cooling air from the compressor section through a diffuser section proximate to the combustor section.

In addition to one or more of the features described above or below, or as an alternative, further embodiments may include where the secondary flow cavity of the turbine section includes a static support structure cooling supply cavity of at least one stage of vanes of the turbine section.

In addition to one or more of the features described above or below, or as an alternative, further embodiments may include where the means for providing the active variable cooling flow includes a compressor bleed port in the engine case proximate to the compressor section.

In addition to one or more of the features described above or below, or as an alternative, further embodiments may include where the bypass duct extends external to the engine case around the combustor section from the compressor bleed port to at least one static support structure cooling supply cavity of the turbine section.

In addition to one or more of the features described above or below, or as an alternative, further embodiments may include where the active variable cooling flow is extracted from a diffuser section proximate to the combustor section.

Also disclosed is a method that includes determining, by a controller, a flight phase of an aircraft. The controller determines an operating parameter of a gas turbine engine of the aircraft, where the gas turbine engine includes a compressor section, a combustor section, and a turbine section surrounded by an engine case and defining a primary flow path. An active variable cooling flow is adjusted through a bypass duct external to the engine case to a secondary flow cavity of the turbine section based on either or both of the flight phase and the operating parameter of the gas turbine engine.

In addition to one or more of the features described above or below, or as an alternative, further embodiments may include where adjusting an active variable cooling flow includes actuating a cooling air metering valve operatively coupled to the bypass duct.

In addition to one or more of the features described above or below, or as an alternative, further embodiments may include controlling the active variable cooling flow through an airflow path within a static structure of the gas turbine engine between the bypass duct and the secondary flow cavity of the turbine section.

In addition to one or more of the features described above or below, or as an alternative, further embodiments may include extracting the active variable cooling flow from a diffuser section proximate to the combustor section.

A system for an aircraft includes a gas turbine engine having a compressor section, a combustor section, and a turbine section surrounded by an engine case and defining a primary flow path. The system includes a bypass duct external to the engine case and configured to provide an active variable cooling flow to a secondary flow cavity of the turbine section, and at least one cooling air metering valve operatively coupled to the bypass duct and configured to control the active variable cooling flow.

In addition to one or more of the features described above or below, or as an alternative, further embodiments may include where the system includes a controller configured to actuate the at least one cooling air metering valve based on either or both of a flight phase and an operating parameter of the gas turbine engine.

In addition to one or more of the features described above or below, or as an alternative, further embodiments may include where the system includes an airflow path within a static structure of the gas turbine engine between the bypass duct and the secondary flow cavity of the turbine section.

A technical effect of systems and methods is achieved by providing active variable turbine cooling in a gas turbine engine as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
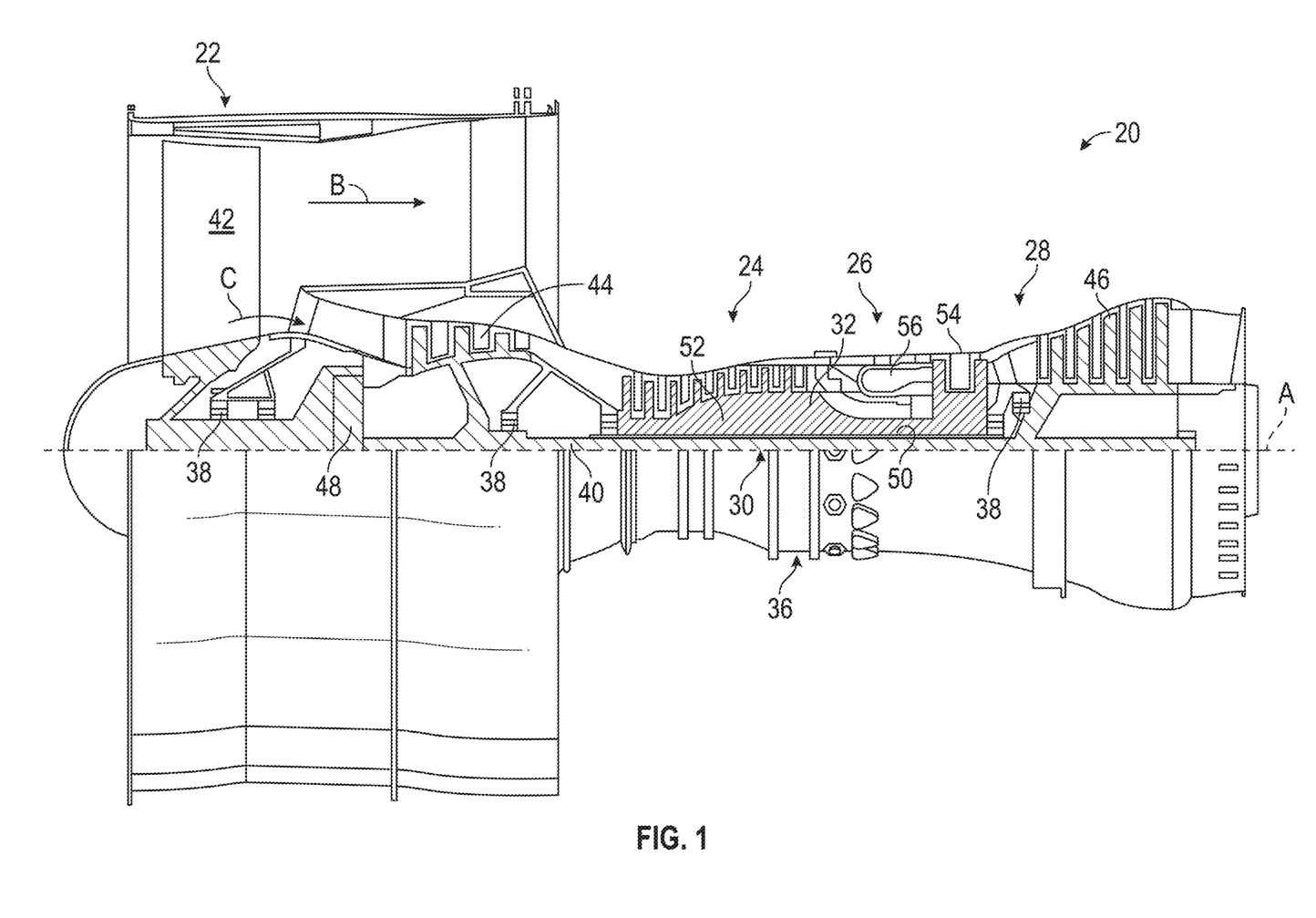
FIG. 1 is a schematic illustration of a gas turbine engine in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
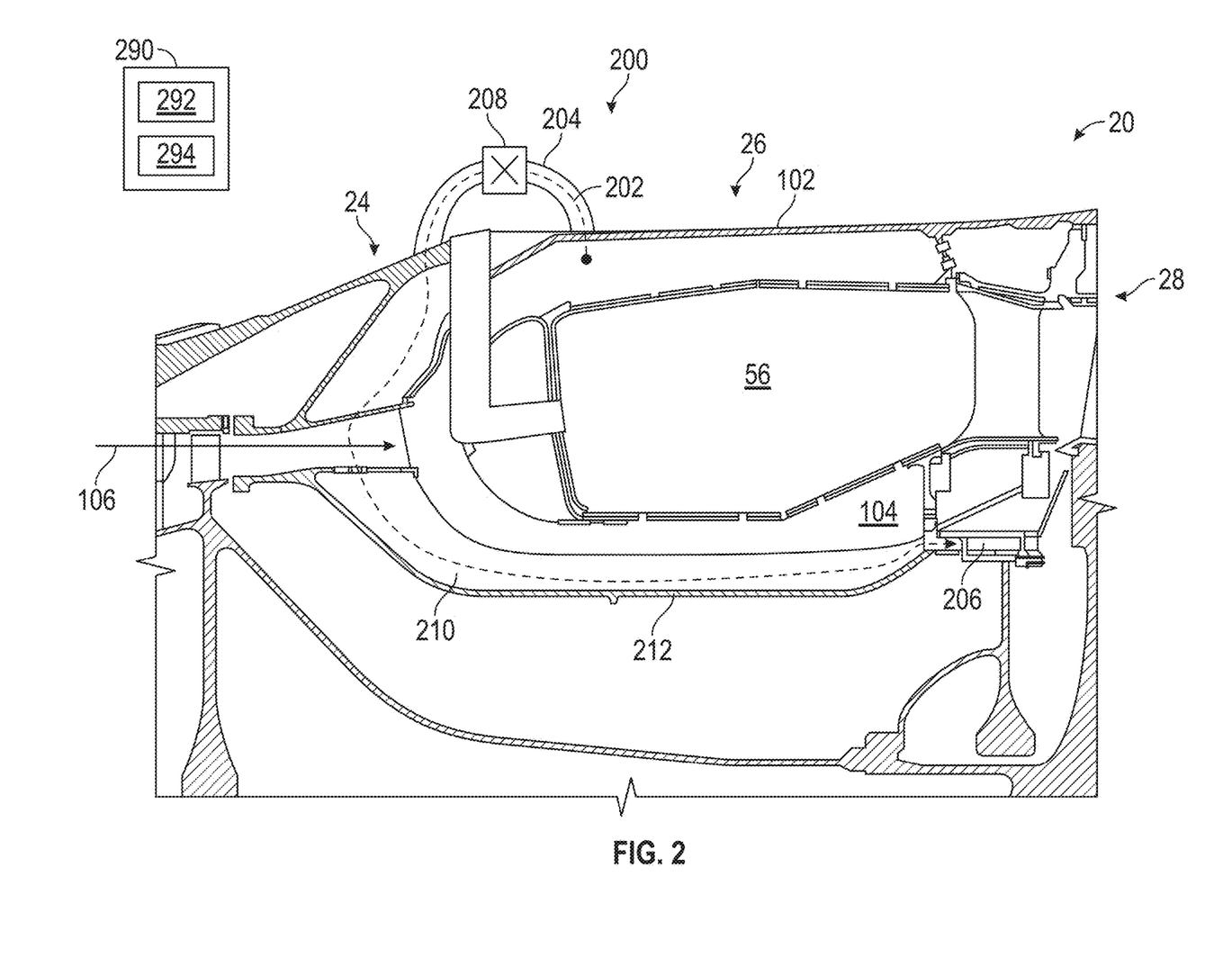
FIG. 2 is a schematic illustration of a cooling system in accordance with an embodiment of the disclosure.

FIG. 2 depicts a cooling system 200 of the gas turbine engine 20 according to an embodiment. The cooling system 200 can include a means for providing an active variable cooling flow 202 through a bypass duct 204 external to an engine case 102 to a secondary flow cavity 206 of the turbine section 28, where the engine case 102 surrounds the compressor section 24, the combustor section 26, and the turbine section 28. The means for providing the active variable cooling flow 202 can include a cooling air metering valve 208 that can be actuated between fully closed, partially opened, and fully opened positions. The cooling air metering valve 208 can be electronically actuated by a controller 290 based on either or both of a flight phase and an operating parameter of the gas turbine engine 20 as further described herein. In some embodiments, the active variable cooling flow 202 can be routed through one or more components of the gas turbine engine 20 to reach the secondary flow cavity 206 internal to the engine case 102. The means for providing the active variable cooling flow 202 can include an airflow path 210 within a static structure 212 of the gas turbine engine 20 between the bypass duct 204 and the secondary flow cavity 206 of the turbine section 28. The airflow path 210 can be an inner diffuser flow path configured to deliver a metered supply of cooling air from the compressor section 24 through a diffuser section 104 of the gas turbine engine 20 proximate to the combustor section 26.

In embodiments, a primary flow path 106 is defined through the compressor section 24, the combustor section 26, and the turbine section 28 as the gas path for compression, combustion, and expansion through core components of the gas turbine engine 20. The secondary flow cavity 206 provides cooling to reduce the temperature of components downstream of the combustor 56. Rather than using a mechanically metered flow established by flow areas and static holes, embodiments actively control cooling between a cooler portion of the gas turbine engine 20 and the secondary flow cavity 206 as dynamically adjusted between a range of flow areas provided by the cooling air metering valve 208. Although a single instance of the bypass duct 204 and the cooling air metering valve 208 is depicted in the example of FIG. 2, a combination of metering valves and ducts can be used to control the flow rate of the active variable cooling flow 202. For example, one or more instances of the cooling air metering valve 208 can control the flow rate and volume of the active variable cooling flow 202. The cooling air metering valve 208 can be a continuously variable position valve or may be a discrete position valve that is modulated (e.g., pulse width modulated) to obtain a partially opened position.

The controller 290 can interface with and control multiple elements of the cooling system 200 and the gas turbine engine 20, such as valve states, flow rates, pressures, temperatures, rotational rates, and the like. In an embodiment, the controller 290 includes a memory system 292 to store instructions that are executed by a processing system 294 of the controller 290. The executable instructions may be stored or organized in any manner and at any level of abstraction, such as in connection with a controlling and/or monitoring operation of the cooling system 200 and/or the gas turbine engine 20. The processing system 294 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 292 may include random access memory (RAM), read only memory (ROM), or other electronic, optical, magnetic, or any other computer readable medium onto which is stored data and control algorithms in a non-transitory form.

Figure 3:
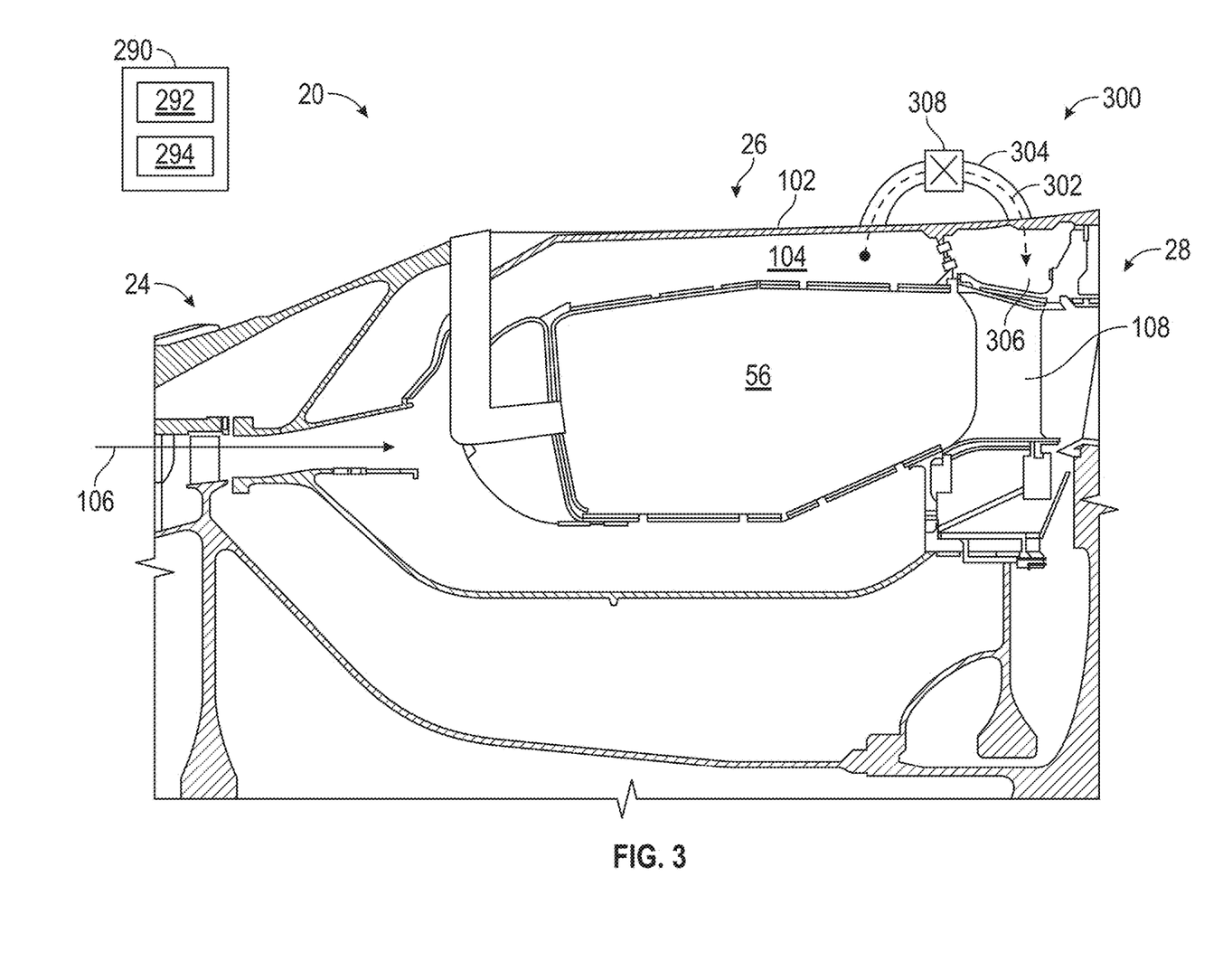
FIG. 3 is a schematic illustration of a cooling system in accordance with an embodiment of the disclosure.

FIG. 3 depicts a cooling system 300 of the gas turbine engine 20 according to an embodiment. The cooling system 300 can include a means for providing an active variable cooling flow 302 through a bypass duct 304 external to an engine case 102 to a secondary flow cavity 306 of the turbine section 28. The means for providing the active variable cooling flow 302 can include a cooling air metering valve 308 that can be actuated between fully closed, partially opened, and fully opened positions. The cooling air metering valve 308 can be electronically actuated by the controller 290. In some embodiments, the active variable cooling flow 302 can be routed through one or more components of the gas turbine engine 20 to reach the secondary flow cavity 306 internal to the engine case 102. The secondary flow cavity 306 of the turbine section 28 can include a static support structure cooling supply cavity of at least one stage of vanes 108 of the turbine section 28. Rather than including cooling holes in a vane support of the vanes 108, the active variable cooling flow 302 can provide cooling between the engine case 102 and the vanes 108. In the example of FIG. 3, the active variable cooling flow 302 can be sourced from the diffuser section 104 that can be cooler than the primary flow path 106 downstream of the combustor 56.

Figure 4:
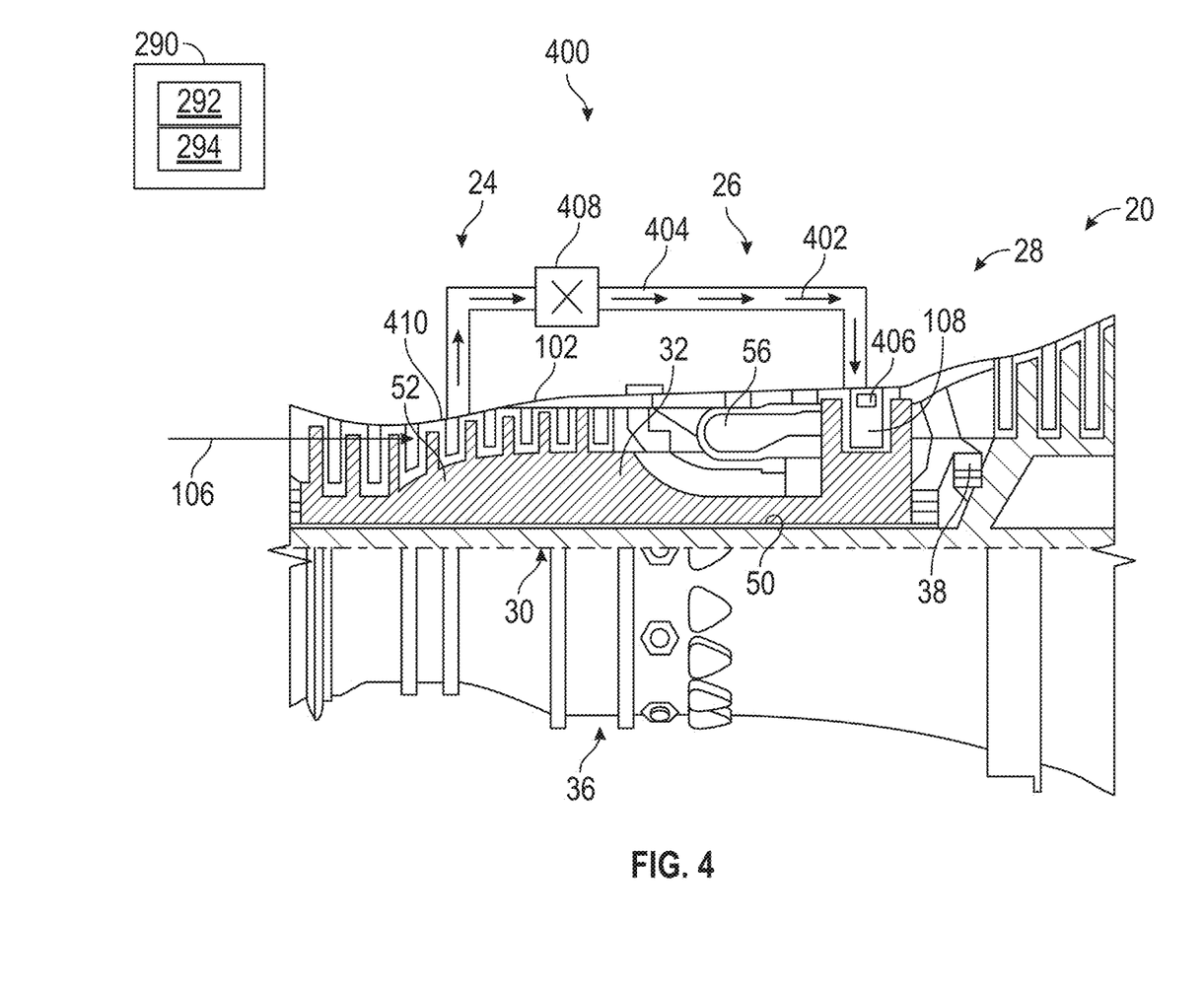
FIG. 4 is a schematic illustration of a cooling system in accordance with an embodiment of the disclosure.

FIG. 4 depicts a cooling system 400 of the gas turbine engine 20 according to an embodiment. The cooling system 400 can include a means for providing an active variable cooling flow 402 through a bypass duct 404 external to an engine case 102 to a secondary flow cavity 406 of the turbine section 28. The means for providing the active variable cooling flow 302 can include a cooling air metering valve 408 that can be actuated between fully closed, partially opened, and fully opened positions. The cooling air metering valve 408 can be electronically actuated by the controller 290. In some embodiments, the active variable cooling flow 402 can be routed through one or more components of the gas turbine engine 20 to reach the secondary flow cavity 406 internal to the engine case 102. The means for providing the active variable cooling flow can include a compressor bleed port 410 in the engine case 102 proximate to the compressor section 24. The bypass duct 404 can extend external to the engine case 102 around the combustor section 26 from the compressor bleed port 410 to at least one static support structure cooling supply cavity (e.g., secondary flow cavity 406) of the turbine section 28, such as at least one stage of vanes 108. Although the examples of FIGS. 2-4 are depicted separately, it will be understood that the cooling systems 200, 300, and/or 400 can be combined to provide multiple cooling flow paths for the same instance of the gas turbine engine 20.

Figure 5:
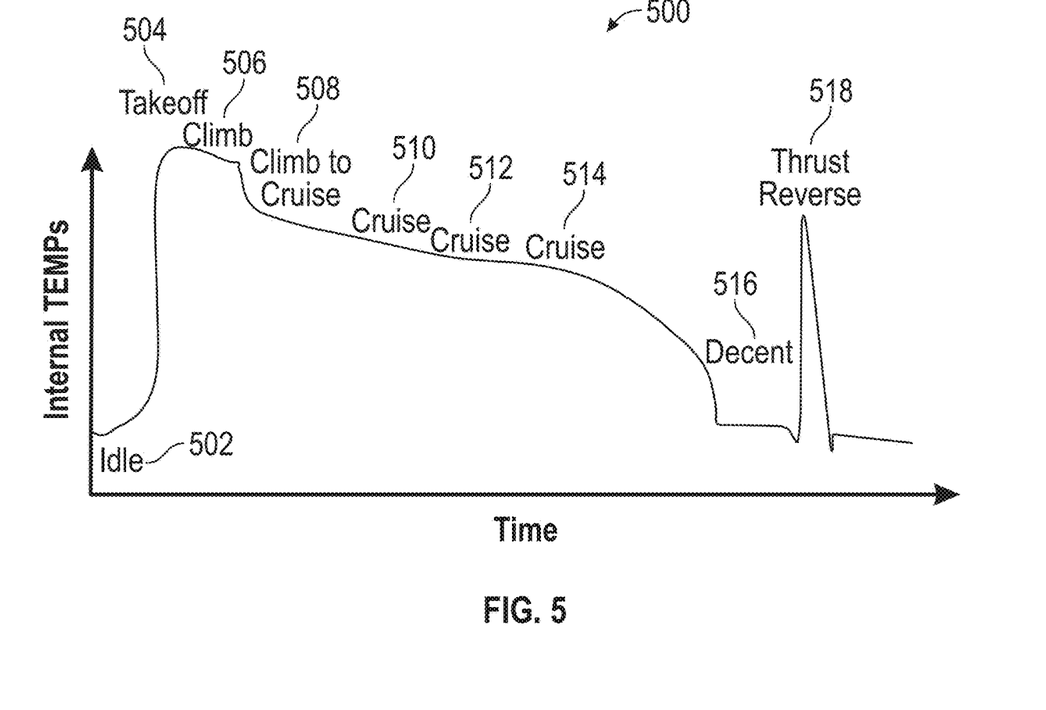
FIG. 5 is a plot of relative internal temperature changes vs. time for a various flight phases in accordance with an embodiment of the disclosure.

FIG. 5 depicts a plot 500 of relative internal temperature changes vs. time for a various flight phases in accordance with an embodiment. The plot 500 can be established for nominal conditions of the gas turbine engine 20 of FIG. 1 and further augmented based on one or more operating parameters of the gas turbine engine 20. For example, by monitoring pressures and temperatures of the gas turbine engine 20, it can be determined how closely a particular instance of the gas turbine engine 20 follows the plot 500, and the use of plot 500 for control actions can be augmented based on variations observed in one or more operating parameters of the gas turbine engine 20.

In the example of FIG. 5, an internal temperature of the gas turbine engine 20 is relatively low at idle 502 and climbs rapidly at takeoff power 504. At climb 506, climb to cruise 508, and subsequent cruise states 510, 512, 514, the internal temperature of the gas turbine engine 20 may gradually reduce as the power demand is reduced and the gas turbine engine 20 is surrounded by cooler ambient air at altitude. The internal temperature of the gas turbine engine 20 can be further reduced at decent 516. A temporary spike in the internal temperature of the gas turbine engine 20 may be experienced during a thrust reverse 518 operation prior to shut down. A greater flow rate of the active variable cooling flow may be needed at higher temperature flight phases, such as at takeoff power 504, climb 506, and climb to cruise 508. During cruise states 510, 512, 514, the active variable cooling flow can be reduced. In some embodiments, the active variable cooling flow can be substantially reduced or partially blocked by the cooling air metering valve during decent 516. Upon detecting a temperature rise or in anticipation of thrust reverse 518, the cooling air metering valve can be opened to increase the active variable cooling flow for a detected or anticipated rapid temperature increase associated with thrust reverse 518.

Figure 6:
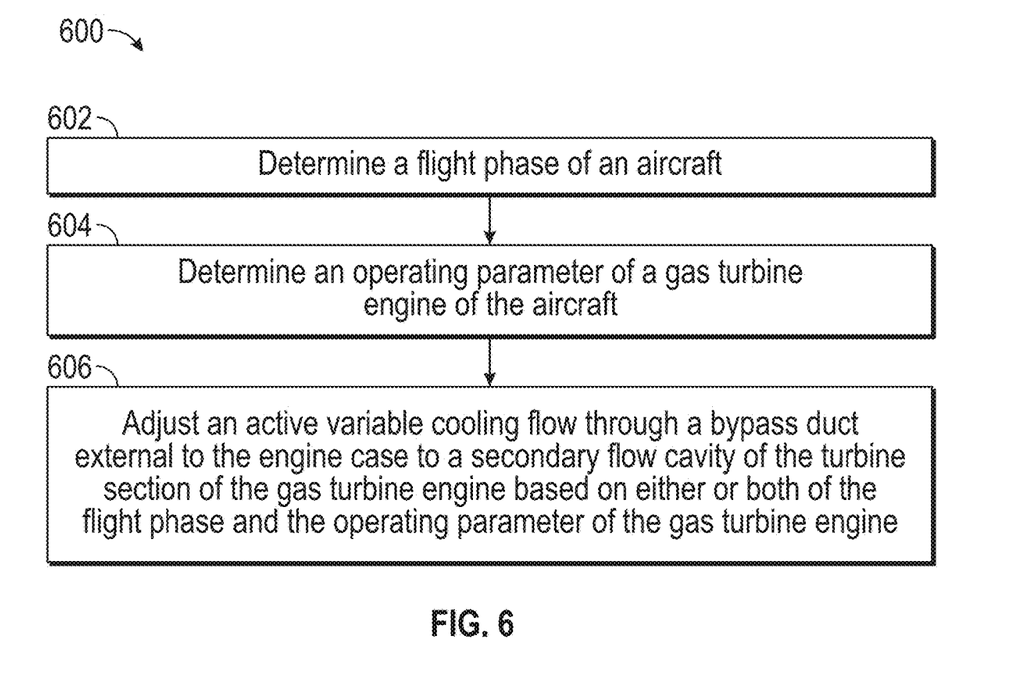
FIG. 6 is a flow chart illustrating a method in accordance with an embodiment of the disclosure.

FIG. 6 is a flow chart illustrating a method 600 of actively cooling a turbine section 28 of a gas turbine engine 20 in accordance with an embodiment. The method 600 of FIG. 6 is described in reference to FIGS. 1-6 and may be performed with an alternate order and include additional steps. The method 600 can be performed, for example, by the systems 200, 300, 400 of FIGS. 2-4, a combination thereof, or an alternate bypass configuration.

At block 602, controller 290 can determine a flight phase of an aircraft. For example, the flight phase can be determined in reference to the plot 500. At block 604, controller 290 can determine an operating parameter of a gas turbine engine 20 of the aircraft. The operating parameter can be one or more of a pressure and/or temperature within the gas turbine engine 20. At block 606, the controller 290 can adjust an active variable cooling flow 202, 302, 402 through a bypass duct 204, 304, 404 external to the engine case 102 to a secondary flow cavity 206, 306, 406 of the turbine section 28 based on either or both of the flight phase and the operating parameter of the gas turbine engine 20. Adjustment of the active variable cooling flow 202, 302, 402 can include actuating a cooling air metering valve 208, 308, 408 operatively coupled to the bypass duct 204, 304, 404.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:
a compressor section;
a combustor section comprising a combustor;
a turbine section operably coupled to the compressor section, wherein a primary flow path is defined through the compressor section, the combustor section, and the turbine section;
an engine case surrounding the compressor section, the combustor section, and the turbine section; and
a means for providing an active variable cooling flow through a bypass duct external to the engine case to a secondary flow cavity of the turbine section, wherein the means for providing the active variable cooling flow comprises an airflow path between an outlet of the bypass duct and the secondary flow cavity of the turbine section, and wherein the secondary flow cavity is configured to provide cooling to reduce the temperature of components downstream of the combustor, and the airflow path is delimited radially by an inner and an outer static structure, wherein the active variable cooling flow is extracted from a diffuser section proximate to the combustor section, and the bypass duct is configured to route the active variable cooling flow to return through the engine case upstream from the diffuser section to the airflow path.

2. The gas turbine engine of claim 1, wherein the means for providing the active variable cooling flow comprises a cooling air metering valve.

3. The gas turbine engine of claim 2, wherein the cooling air metering valve is electronically actuated based on either or both of a flight phase and an operating parameter of the gas turbine engine.

4. The gas turbine engine of claim 1, wherein the airflow path is configured to deliver a metered supply of cooling air.

5. The gas turbine engine of claim 1, wherein the active variable cooling flow is provided through the engine case to the bypass duct.

6. The gas turbine engine of claim 1, further comprising a controller configured to determine a flight phase of an aircraft and one or more operating parameters comprising one or more of a pressure and/or temperature within the gas turbine engine, wherein the means for providing the active variable cooling flow comprises a cooling air metering valve controlled by the controller and actuated between fully closed, partially opened, and fully opened positions based on the flight phase and the one or more operating parameters.

7. The gas turbine engine of claim 6, wherein the controller is configured to control the cooling air metering valve to reduce the active variable cooling flow through the bypass duct for descent and open the cooling air metering valve to increase the active variable cooling flow through the bypass duct for thrust reverse.

8. A method comprising:
determining, by a controller, a flight phase of an aircraft;
determining, by the controller, one or more operating parameters of a gas turbine engine of the aircraft, the gas turbine engine comprising a compressor section, a combustor section comprising a combustor, and a turbine section surrounded by an engine case and defining a primary flow path;
extracting an active variable cooling flow from a diffuser section proximate to the combustor section;
adjusting the active variable cooling flow through a bypass duct external to the engine case to a secondary flow cavity of the turbine section based on either or both of the flight phase and the one or more operating parameters of the gas turbine engine; and controlling the active variable cooling flow through an airflow path between the bypass duct and the secondary flow cavity of the turbine section, wherein the secondary flow cavity is configured to provide cooling to reduce the temperature of components downstream of the combustor, and the airflow path is delimited radially by an inner and an outer static structure, wherein the bypass duct is configured to route the active variable cooling flow to return through the engine case upstream from the diffuser section to the airflow path.

9. The method of claim 8, wherein adjusting the active variable cooling flow comprises actuating a cooling air metering valve operatively coupled to the bypass duct.

10. The method of claim 8, wherein the airflow path is configured to deliver a metered supply of cooling air.

11. The method of claim 8, wherein the active variable cooling flow is provided through the engine case to the bypass duct.

12. The method of claim 8,
wherein the one or more operating parameters comprise one or more of a pressure and/or temperature within the gas turbine engine, wherein the active variable cooling flow is provided by a cooling air metering valve actuated between fully closed, partially opened, and fully opened positions based on the flight phase and the one or more operating parameters.

13. The method of claim 12, further comprising:
controlling the cooling air metering valve to reduce the active variable cooling flow through the bypass duct for descent and open the cooling air metering valve to increase the active variable cooling flow through the bypass duct for thrust reverse.

14. A system for an aircraft, the system comprising:
a gas turbine engine comprising a compressor section, a combustor section with a combustor, and a turbine section surrounded by an engine case and defining a primary flow path;
a bypass duct external to the engine case and configured to provide an active variable cooling flow to a secondary flow cavity of the turbine section;
at least one cooling air metering valve operatively coupled to the bypass duct and configured to control the active variable cooling flow; and
a controller configured to control the at least one cooling air metering valve to provide the active variable cooling flow through the bypass duct in an airflow path between an outlet of the bypass duct and the secondary flow cavity of the turbine section, and wherein the secondary flow cavity is configured to provide cooling to reduce the temperature of components downstream of the combustor, and the airflow path is delimited radially by an inner and an outer static structure, and wherein the active variable cooling flow is extracted from a diffuser section proximate to the combustor section, and the bypass duct is configured to route the active variable cooling flow to return through the engine case upstream from the diffuser section to the airflow path.

15. The system of claim 14, wherein the airflow path is configured to deliver a metered supply of cooling air.

16. The system of claim 14, wherein the controller is configured to determine a flight phase of the aircraft and one or more operating parameters comprising one or more of a pressure and/or temperature within the gas turbine engine, and the controller is configured to actuate the at least one cooling air metering valve between fully closed, partially opened, and fully opened positions based on the flight phase and the one or more operating parameters.

17. The system of claim 16, wherein the controller is configured to control the at least one cooling air metering valve to reduce the active variable cooling flow through the bypass duct for descent and open the cooling air metering valve to increase the active variable cooling flow through the bypass duct for thrust reverse.

* * * * *